(12) United States Patent
Hwang

(10) Patent No.: US 8,577,301 B1
(45) Date of Patent: Nov. 5, 2013

(54) ANALOG BASEBAND INTERFACE FOR COMMUNICATION SYSTEMS

(75) Inventor: Justin Hwang, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1147 days.

(21) Appl. No.: 12/043,862

(22) Filed: Mar. 6, 2008

Related U.S. Application Data

(60) Provisional application No. 60/896,249, filed on Mar. 21, 2007.

(51) Int. Cl.
*H04B 17/00* (2006.01)
*H03J 7/32* (2006.01)

(52) U.S. Cl.
USPC ............ 455/67.11; 455/115.1; 455/146

(58) Field of Classification Search
USPC ........ 455/143, 146, 225, 303, 142, 553.1, 73, 455/562.1, 575.7, 272, 279.1, 333, 67.14, 455/67.11, 115.1, 115.2
See application file for complete search history.

(56) References Cited

U.S. PATENT DOCUMENTS 6,882,833 B2 * 4/2005 Nguyen .................. 455/137
7,149,490 B1 * 12/2006 Gunzelmann ............ 455/313

* cited by examiner

*Primary Examiner* — Eugene Yun
(74) *Attorney, Agent, or Firm* — Bever, Hoffman & Harms, LLP

(57) ABSTRACT

A communication system interface between a baseband unit and a radio frequency (RF) unit is configured to advantageously use a common set of lines to carry both transmit and receive baseband analog signals between the baseband and RF unit, thereby enabling a relatively lower signal count and permitting loopback testing of elements within the baseband and the RF units.

10 Claims, 5 Drawing Sheets

ANALOG BASEBAND INTERFACE FOR COMMUNICATION SYSTEMS

RELATED APPLICATIONS

This application claims priority of U.S. Provisional Patent Application 60/896,249, entitled "Analog Baseband Interface For Communication Systems" filed Mar. 21, 2007.

BACKGROUND OF THE INVENTION

1. Field of the Invention

Embodiments described in this specification relate generally to communications systems and more particularly to an analog baseband interface between wireless communication units.

2. Description of the Related Art

Wireless communications systems generally use radio frequency (RF) signals to transmit data from a transmitter to one or more receivers. Wireless communication systems are frequently used to implement wireless local area networks (LANs) in which data is transmitted and received between computers, servers, Ethernet switches, hubs, and the like. A wireless LAN may, for example, allow web page data to be transferred between a server and a computer.

Many wireless communication systems may be divided into two or more units. A typical division occurs between an RF unit and a baseband unit. The RF unit may convert transmit baseband analog signals into RF signals that may be transmitted through an antenna. The RF unit may also receive an RF signal from an antenna and convert the RF signal to a receive baseband analog signal. The baseband unit, working in conjunction with the RF unit, may create the transmit baseband analog signal the RF unit processes and transmits and may also receive a receive baseband analog signal from the RF unit that has been generated from a received RF signal.

The baseband unit is typically coupled to other units within the wireless communication system. Other typical elements of wireless communication systems may include elements configured to process data to be transmitted. For example, data may need to be encoded by an encoding element before the data can be processed by the baseband unit and then coupled to the RF unit for transmission. Still other typical elements of a wireless communication system may also include one or more digital signal processing units that can further process the data generated by the baseband unit from the analog signal received from the RF unit.

FIG. 1 illustrates an exemplary prior art wireless communication system 100 including a baseband unit 101 and an RF unit 111. Baseband unit 101 includes a digital to analog converter (DAC) 102 and an analog to digital converter (ADC) 103, whereas RF unit 111 includes a transmitter (TX) 112 and a receiver (RX) 113. One or more antennas 110 may be coupled to RF unit 111. In many cases, RX 113 and TX 112 may share antenna 110 (shown).

TX 112 of RF unit 111 is coupled via lines to DAC 102 in baseband unit 101. Many wireless communication systems are configured to transmit more than one RF signal contemporaneously. For example, two quadrature RF signals are usually transmitted to support orthogonal frequency-division multiplexing (OFDM) defined by wireless communication standards IEEE 802.11a or 802.11g. Therefore, TX 112 is usually configured to accept two transmit baseband analog signals. The two transmit baseband analog signals are also often relatively high bandwidth signals in order to support relatively high data transfer rates.

Differential line pairs are often used for high bandwidth signals in order to increase, among other things, noise immunity and performance. One embodiment of a differential line pair encodes a signal with a positive component and a negative component. These two components are typically implemented with two lines, each line carrying one component.

Oftentimes, the coupling between DAC 102 and TX 112 is through two differential line pairs. FIG. 1 shows two differential line pairs 107 (i.e. I+, I−, Q+, and Q−) from DAC 102 in baseband unit 101 to TX 112 in RF unit 111. RX 113 receives an RF signal through antenna 110 and recovers one or more receive baseband analog signals. As shown in FIG. 1, two differential line pairs also couple RX 113 to ADC 103 in baseband unit 101, thereby facilitating the contemporaneous receipt of two receive baseband analog signals (for the same reason as described above in the transmit case). Thus, wireless communication system 100 includes four differential line pairs coupling baseband unit 101 and RF unit 111 (i.e. eight discrete lines in total).

Multiple-input multiple-output (MIMO) wireless LAN architectures may provide improved performance when compared to single-input single-output architectures. The improved performance may be provided by, in part, using a plurality of transmitters and receivers (transceivers) to process RF signals. FIG. 2 illustrates a portion of an exemplary multiple transceiver wireless communication system 200, which can be characterized as an extension of the system configuration of FIG. 1 (but is not known to be implemented or discussed in the prior art). System 200, like system 100 (FIG. 1), includes a baseband unit 201 and an RF unit 211. However, in system 200, baseband unit 201 and RF unit 211 are divided into three sub-units, i.e. A, B, and C (indicated by the suffix of each reference number). Note that in other embodiments, baseband unit 201 and RF unit 211 may be divided into two sub-units or more than three sub-units.

A first baseband sub-unit 201A includes a first DAC 202A and a first ADC 203A, a second baseband sub-unit 201B includes a second DAC 202B and a second ADC 203B, and a third baseband sub-unit 201C includes a third DAC 202C and a third ADC 203C. A first RF sub-unit 211A includes a first transmitter (TX) 212A and a first receiver (RX) 213A, a second RF sub-unit 211B includes a second TX 212B and a second RX 213B, and a third RF sub-unit 211C includes a third TX 212C and a third RX 213C.

System 200, like system 100, uses differential line pairs to couple the elements in baseband unit 201 to the elements in RF unit 211. In system 200, two differential line pairs couple the DACs to the TXs and two differential line pairs couple the RXs to the ADCs. Therefore, to couple baseband unit 201 to RF unit 211, twenty-four discrete, inter-unit lines (i.e. lines between baseband unit 201 and RF unit 211) are required.

Note that wireless communication system 200 may be configured to enable loopback testing. Loopback testing is a testing method that allows a user to test or calibrate portions of a wireless communication system without the need to transmit or receive data to or from a second wireless communication system. Loopback testing, therefore, advantageously makes possible some amount of testing or calibration of the wireless communication system without relying on a separate wireless communication system.

Typically, during loopback testing, data passes through a loopback processing chain of elements that includes a DAC, a TX, a RX, and an ADC. Oftentimes, the loopback processing chain is configured such that the DAC is coupled to the TX that is coupled to the RX that is further coupled to the ADC. All the elements within the loopback processing chain may function contemporaneously to process test data. Specifically, the test data is often introduced into the loopback processing chain at the DAC, proceeds from the DAC to the TX, continues from the TX to the RX and finally travels to the ADC. The testing and calibration may come about by understanding the test data that is introduced to the loopback processing chain and examining the data that is returned from the loopback processing chain.

For example, using system 200 to test sub-unit A in loopback fashion, test data would be introduced to DAC 202A; DAC 202A would send data to TX 212A. The output of TX 212A would be sent to RX 213A. The output of RX 213A would then be sent to ADC 203A. The data from ADC 203A would then be examined. Thus, when wireless communication system 200 is configured in this fashion, the elements within the loopback processing chain may function contemporaneously, and one or more of the elements within the first baseband sub-unit 201A (i.e. DAC 202A and 203A) and the first RF sub-unit 211A (i.e. TX 212A and RX 213A) may be tested or calibrated.

One drawback to the architecture of system 200 is the relatively high inter-unit line count between baseband unit 201 and RF unit 211. Specifically, consider a typical implementation of wireless communication system 200 in which baseband unit 201 and RF unit 211 are on separate integrated circuits (ICs). In this implementation, each line coupling baseband unit 201 to RF unit 211 may require two pins, i.e. each IC may require one pin to connect to each line. Thus, each differential line pair may require four pins, i.e. each IC may require two pins to connect to each differential line pair. As a result, the twelve differential line pairs coupling baseband unit 201 and RF unit 211 may require twenty-four pins on each IC or forty-eight pins in total. As is well-known, relatively greater amounts of pins can significantly and undesirably increase the cost of an IC package.

Another drawback is that relatively large numbers of high-speed, differential line pairs, particularly differential traces used to couple baseband unit 201 and RF unit 211, may be relatively difficult to design. Specifically, differential traces may have relatively more stringent design rules than other, low speed traces. As is well-known, more stringent design rules generally require more design effort than less stringent design rules, such as those that may be required for low speed traces. Therefore, more differential lines pairs generally increase the design effort required to a design wireless communication system.

Therefore, a need arises to reduce the number of lines between baseband and RF units in a wireless communication system while still retaining the advantages of loopback testing.

SUMMARY OF THE INVENTION

A wireless communication system that advantageously reduces the number of lines between baseband and RF units is provided. This wireless communication system can include a baseband unit, an RF unit, and a plurality of sets of inter-unit lines. The baseband unit can include a plurality of baseband sub-units, wherein each baseband sub-unit can include a digital to analog converter (DAC) and an analog to digital converter (ADC). The RF unit can include a plurality of RF sub-units, wherein each RF unit can include a transmitter (TX) and a receiver (RX). Each set of inter-unit lines can connect a baseband sub-unit and a corresponding RF sub-unit. Moreover, each baseband sub-unit and its corresponding RF sub-unit can form a processing section. Notably, a DAC and a TX of one processing section and an RX and an ADC of another processing section can use the same set of inter-unit lines to communicate. This inter-unit line configuration minimizes the number of lines between the baseband and RF units.

This wireless communication system can further include a plurality of intra-unit lines for connecting DACs and ADCs of different baseband sub-units and for connecting TXs and RXs of different RF sub-units. These intra-unit lines, along with the above-described sets of inter-unit lines, can advantageously facilitate loopback testing. In one embodiment to further facilitate loopback testing, the DACs and the RXs can have enabled/disabled output terminals. Note that each set of inter-unit lines can include I/Q differential lines or other types of lines. Notably, in one embodiment, the baseband and RF units can be implemented on different integrated circuits (ICs) and the plurality of sets of inter-unit lines can be connected to pads of those ICs.

Another, more generalized, wireless communication system that reduces the number of lines between baseband and RF units is provided. This wireless communication system can include a baseband unit, an RF unit, and a plurality of sets of inter-unit lines. The baseband unit can include a plurality of baseband sub-units and the RF unit can include a plurality of RF sub-units. Each set of inter-unit lines can connect a baseband sub-unit and a corresponding RF sub-unit. Moreover, each baseband sub-unit and its corresponding RF sub-unit can form a processing section. Advantageously, communication from a first baseband sub-unit to a first RF unit of a first processing section and from a second RF sub-unit to a second baseband sub-unit of a second processing section can share a set of inter-unit lines.

This generalized wireless communication system can further include a plurality of intra-unit lines for connecting components of different baseband sub-units and for connecting components of different RF sub-units. In one embodiment, certain components of each baseband sub-unit and RF sub-unit can have enabled/disabled output terminals to coordinate sharing of the inter-unit lines. Note that each set of inter-unit lines can include I/Q differential lines or other types of lines. In one embodiment, the baseband and RF units can be implemented on different ICs and the plurality of sets of inter-unit lines can be connected to pads of the first and second ICs.

A method of communicating in a wireless system having the above-described configurations can include communicating from a first baseband sub-unit to a first RF unit of a first processing section and from a second RF sub-unit to a second baseband sub-unit of a second processing section by sharing a common set of inter-unit lines. In other words, communicating from the first baseband sub-unit to the first RF unit of the first processing section and from the first RF sub-unit to the first baseband sub-unit can be advantageously accomplished using inter-unit lines of different processing sections. To provide the desired loopback configuration, two sets of inter-unit lines, intra-unit lines within the baseband and RF units, and antenna lines of the targeted processing section can be used.

DETAILED DESCRIPTION

Many wireless communication systems include baseband and RF units where each baseband and RF unit includes a plurality of baseband and RF sub-units, respectively. It is advantageous to reduce the relative number of inter-unit lines used to couple a baseband sub-unit to an RF sub-unit because as the number of sub-units increase, so may the number of coupling lines. As described above, reducing the relative amount of the inter-unit lines may help ease system design and reduce costs.

One method to reduce the number of inter-unit lines between a baseband unit and an RF unit configures those units to use the same lines to carry both receive baseband analog signals and transmit baseband analog signals. This is possible because, oftentimes in normal operation, the baseband unit is either processing data to transmit or to receive, but generally not processing transmit and receive data simultaneously. In one embodiment, a DAC and an RX may have outputs that may be controllably enabled. The outputs of the DAC may be enabled when transmitting RF signals and the outputs of the RX may be enabled when receiving RF signals. In some embodiments, configuration may be accomplished by controlling tri-state drives. In other embodiments, switches may selectively couple the active output to the inter-unit line.

Figure 3:
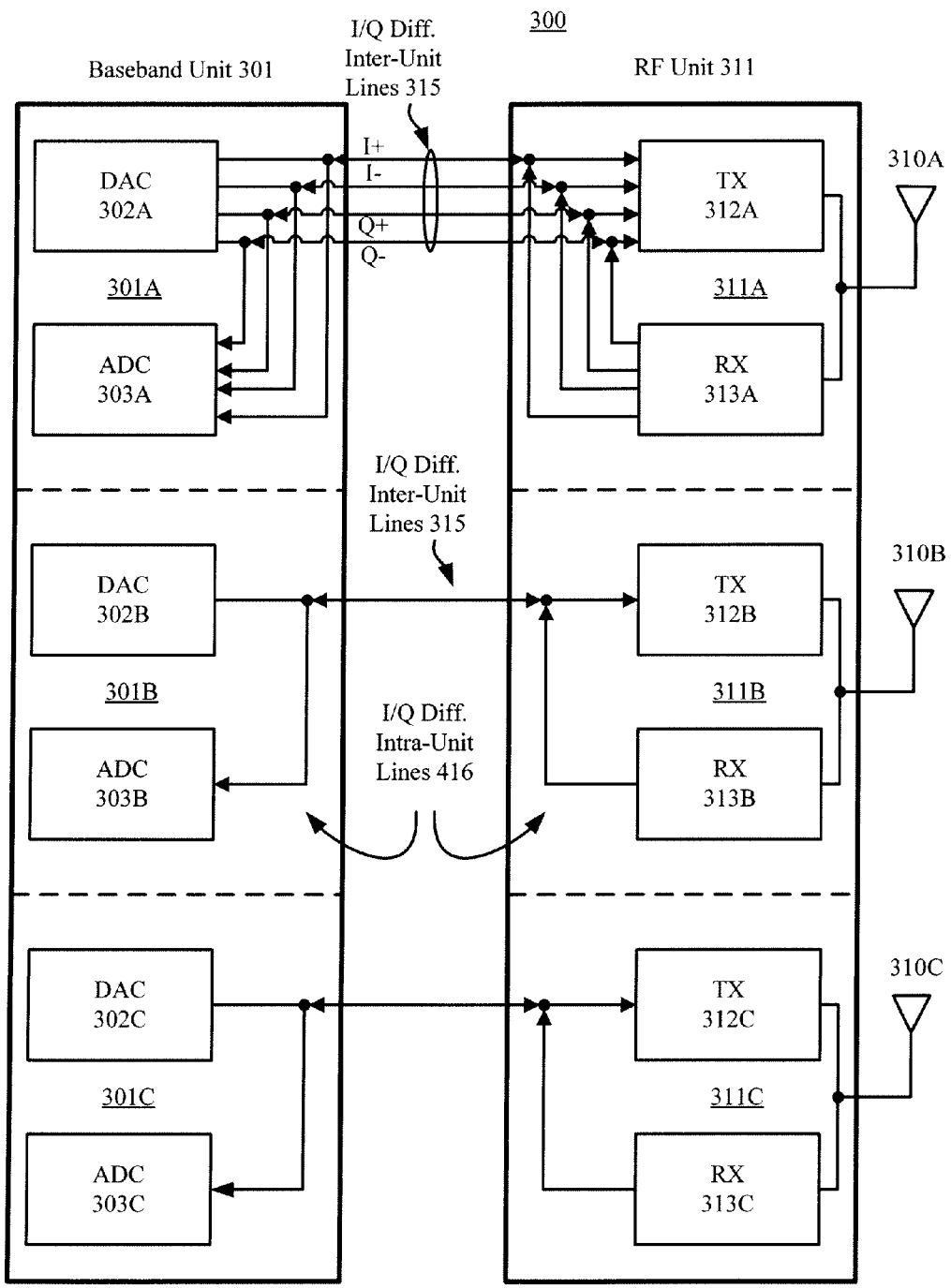
FIG. 3 is a block diagram illustrating a portion of an exemplary multiple transceiver wireless communication system configured to reduce the number of lines between baseband and RF units.

FIG. 3 illustrates a portion of an exemplary multiple transceiver wireless communication system 300 configured to reduce the number of lines between a baseband unit 301 and an RF unit 311. In system 300, baseband unit 301 and RF unit 311 are each divided into three sub-units (i.e. A, B, and C). A first baseband sub-unit 301A includes a first DAC 302A and a first ADC 303A, a second baseband sub-unit 301B includes a second DAC 302B and a second ADC 303B, and a third baseband sub-unit 301C includes a third DAC 302C and a third ADC 303C. Similarly, a first RF sub-unit 311A includes a first TX 312A and a first RX 313A, a second RF sub-unit 311B includes a second TX 312B and a second RX 313B, and a third RF sub-unit 311C includes a third TX 312C and a third RX 313C.

First DAC 301A is coupled to first TX 212A through a set of I/Q differential inter-unit lines 315. Notably, first RX 313A is coupled to first ADC 302A through the same set of I/Q differential inter-unit lines 315. Second and third baseband sub-units are coupled to the second and third RF sub-units, respectively, using similar sets of I/Q differential inter-unit lines 315. Note that, for simplicity in FIG. 3 (and subsequent figures), sets of I/Q differential lines have been reduced to a single line). Thus, in this embodiment, each line in the figure (other than the I/Q differential lines in and between baseband sub-unit 301A and RF sub-unit 311A) represents I/Q differential lines. Therefore, in this example, four I/Q differential lines couple each baseband sub-unit with its corresponding RF sub-unit. Note that the black circles represent full connections between the lines.

Advantageously, wireless communication system 300 of FIG. 3 has relatively few I/Q differential inter-unit lines between baseband unit 301 and RF unit 311 because receive baseband analog signals and transmit baseband analog signals may be carried on the same I/Q differential inter-unit lines. In one embodiment, a DAC and a receiver may have outputs that may be controllably enabled/disabled during actual operation. For example, to transmit an RF signal through first TX 312A, first DAC 302A may have its output enabled while the output of first RX 313A is not enabled. Data from first DAC 302A may then be provided to first TX 312A. On the other hand, to receive an RF signal through first RX 313A, the output of first RX 313A is enabled while the output of first DAC 302A is not enabled. Data from first RX 313A may then be provided to first ADC 303A.

Figure 1:
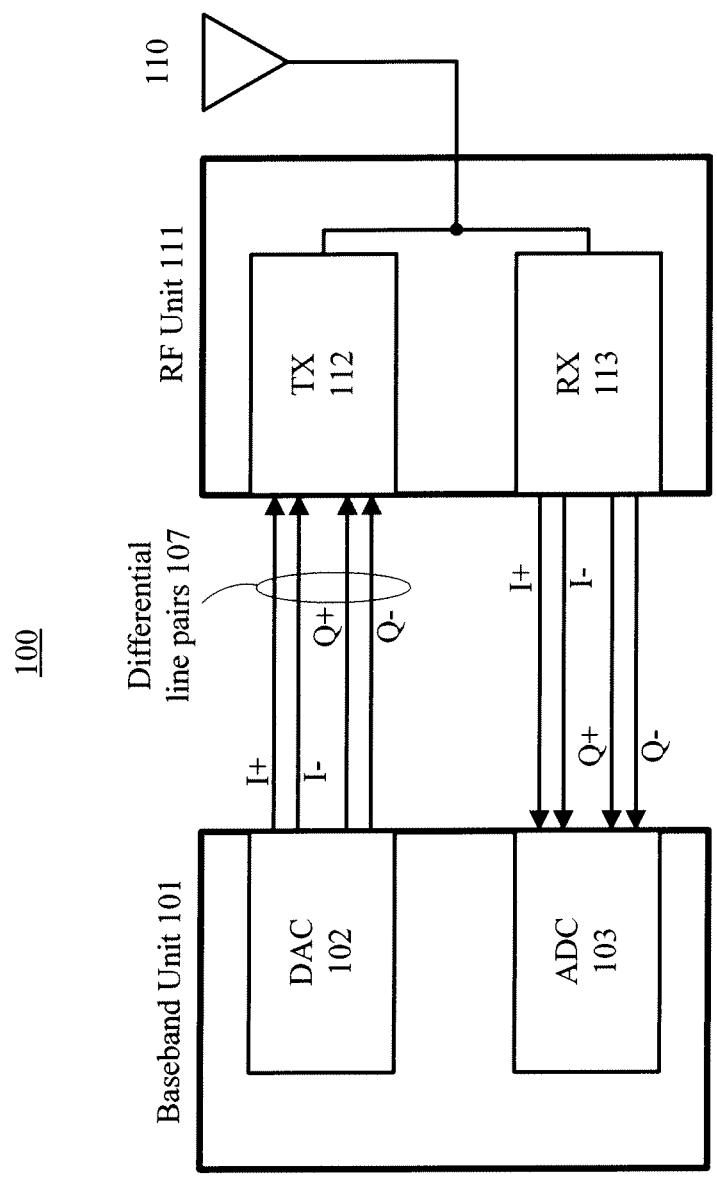
FIG. 1 is a block diagram illustrating a portion of a prior art wireless communication system.
Figure 2:
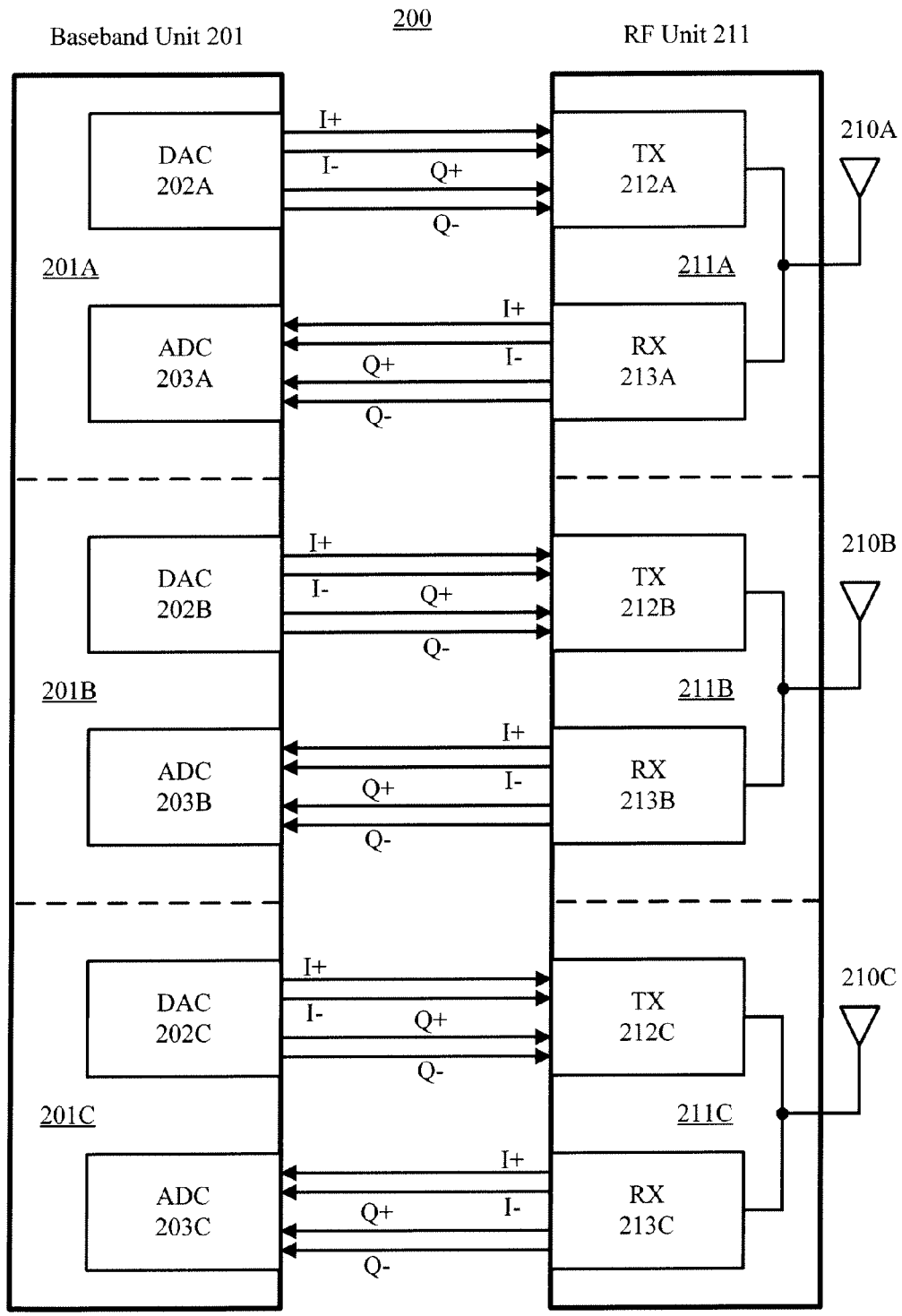
FIG. 2 is a block diagram illustrating portion of an exemplary multiple transceiver wireless communication system.

Note that while wireless communication systems 200 and 300 (FIGS. 2 and 3, respectively) are similarly configured with each system including three baseband sub-units and three RF sub-units, system 200 uses twenty-four I/Q differential inter-unit lines whereas system 300 advantageously uses only twelve I/Q differential lines to couple the baseband unit to the RF unit. One disadvantage, however, of system 300 is that loopback testing of a selected RF unit cannot easily be configured.

Loopback testing, as described above, configures a loopback processing chain of elements within a baseband sub-unit and an RF sub-unit such that the elements may contemporaneously process test data, thereby enabling testing or calibration of one or more of the elements within the baseband sub-unit and the RF sub-unit. However, because wireless communication system 300 cannot be so configured, loopback testing cannot be implemented. For example, referring to first baseband sub-unit 301A and first RF sub-unit 311A, note that the output of first DAC 302A is coupled to the input of first ADC 303A. Thus, first TX 312A and first RX 313A may not be tested because the test data may pass substantially between first DAC 302A and first ADC 303A, thereby bypassing first TX 312A and first RX 313A. Because second and third baseband sub-units 301B/301C and RF sub-units 311B/311C are similarly configured, those sub-units may not be configured for loopback testing either.

Figure 4:
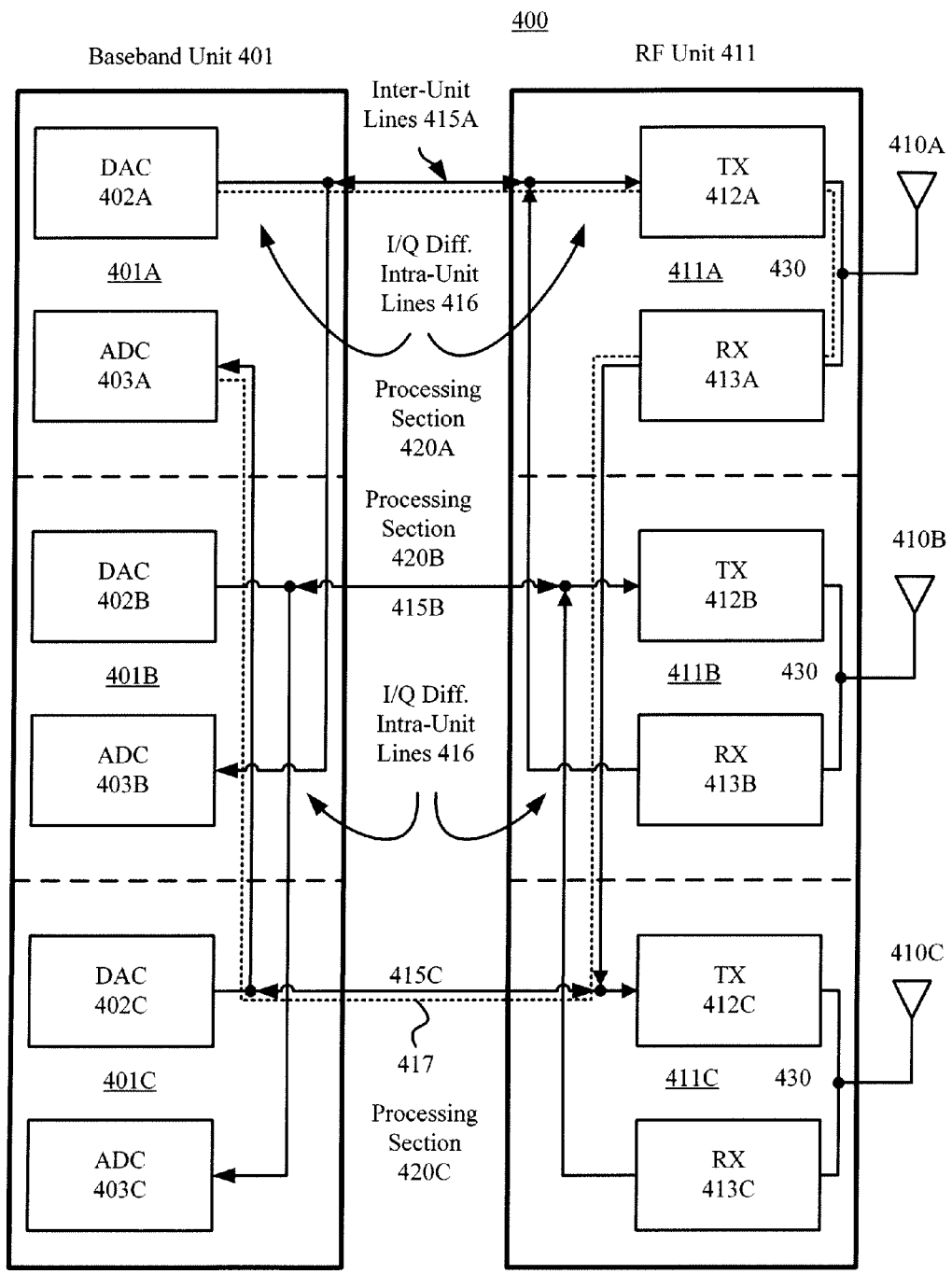
FIG. 4 is a block diagram illustrating an exemplary embodiment of a portion of a multiple transceiver wireless communication system configured according to the specification.

FIG. 4 illustrates a portion of an exemplary wireless communication system 400 configured to provide loopback testing. Wireless communication system 400 includes a baseband unit 401 and an RF unit 402, each of which is divided into three sub-units. A first baseband sub-unit 401A includes a first DAC 402A and a first ADC 403A, a second baseband sub-unit 401B includes a second DAC 402B and a second ADC 403B, and a third baseband sub-unit 4010 includes a third DAC 402C and a third ADC 403C. A first RF sub-unit 411A includes a first TX 412A and a first RX 413A, a second RF sub-unit 411B includes a second TX 412B and a second RX 413B, and a third RF sub-unit 411C includes a third TX 412C and a third RX 413C.

As described in further detail below, baseband sub-units 401A, 401B, and 401C include I/Q differential intra-unit lines 416. RF sub-units 411A, 411B, and 411C similarly include I/Q differential intra-unit lines 416 and antenna lines 430 (note that antenna lines 430 are shown as being on-chip, but could also be implemented off-chip). Using intra-unit lines 416, first DAC 402A is coupled to second ADC 403B, second DAC 402B is coupled to third ADC 403C, third DAC 402C is coupled to first ADC 403A, first TX 412A is coupled to second RX 413B, second TX 412B is coupled to third RX 413C, and third TX 412C is coupled to first RX 413A. Antenna lines 430 connect antenna 410A to TX 412A and RX 413A, antenna 410B to TX 412B and RX 413B, and antenna 410C to TX 412C and RX 413C.

In system 400, each baseband sub-unit can be characterized as having a corresponding RF sub-unit. For example, baseband sub-unit 401A has a corresponding RF sub-unit 411A, baseband sub-unit 401B has a corresponding RF sub-unit 411B, and baseband sub-unit 401C has a corresponding RF sub-unit 411C. Note that in other embodiments, baseband unit 401 and RF unit 402 may include two or more than three sub-units. As used herein, the term "processing section" refers to a baseband sub-unit and its corresponding RF unit. Thus, system 400 includes three processing sections 420A, 420B, and 420C.

As described in further detail below, each processing section includes a set of I/Q differential inter-unit lines that connect a baseband sub-unit and its corresponding RF sub-unit. For example, processing section 420A includes a set of I/Q differential inter-unit lines 415A. Similarly, processing section 420B includes a set of I/Q differential inter-unit lines 415B, and processing section 420C includes a set of I/Q differential inter-unit lines 415C.

Notably, in contrast to wireless communication system 300 (FIG. 3), the transmit baseband analog and the receive baseband analog signals associated with a specific processing section in wireless communication system 400 are not carried on the same set of inter-unit lines. For example, first DAC 402A is coupled to first TX 412A using inter-unit lines 415A, whereas first RX 413A is coupled to first ADC 403A using inter-unit lines 415C; second DAC 402B is coupled to second TX 412B using inter-unit lines 415B, whereas second RX 413B is coupled to second ADC 403B using inter-unit lines 415A; and third DAC 402C is coupled to third TX 413C using inter-unit lines 415C, whereas third RX 413C is coupled to third ADC 403C using inter-unit lines 415B. This exemplary arrangement of lines advantageously enables the configuration of one or more loopback processing chains, as is described below in greater detail.

In one embodiment, the output terminals of the DACs and the RXs may be controllably enabled to allow the transmit baseband analog signal and the receive baseband analog signal to be carried on the same lines. During normal operation, wireless communication system 400 may be configured to transmit and receive RF signals in a manner similar to wireless communication system 300 (FIG. 3). For example, to transmit an RF signal through first TX 402A, first DAC 402A may have its output terminal enabled while the output terminal of second RX 413B is not enabled (noting that first DAC 402A and second RX 413B share the same set of I/Q differential inter-unit lines). Data from first DAC 402A may then be provided to first TX 412A. On the other hand, to receive an RF signal through second RX 413B, the output terminal of second RX 413B is enabled while the output terminal of first DAC 402A is not enabled. Data from second RX 413B may then be provided to second ADC 403B.

Advantageously, wireless communication system 400 of FIG. 4 may be configured to enable loopback testing. In one embodiment, a baseband sub-unit may be coupled to an RF sub-unit and the elements within those sub-units may form a loopback processing chain comprised of a DAC, a transmitter, a receiver and an ADC. All elements within the loopback processing chain may function contemporaneously and process test data using two sets of I/Q differential inter-unit lines, I/Q different intra-unit lines extending across two or more sub-units, and the antenna lines of the targeted processing section.

For example, first baseband sub-unit 401A and first RF sub-unit 411A (i.e. processing section 420A) may be configured for loopback testing. In this case, a loopback processing chain may be configured that includes first DAC 402A, first TX 412A, first RX 413A, and first ADC 403A. First DAC 402A is coupled to first TX 412A (using a first set of I/Q differential inter-unit lines). TX 412A is coupled to first RX 413A using antenna lines 430 of RF sub-unit 411A. Notably, RX 413A is coupled to first ADC 403A using I/Q differential intra-unit lines in RF sub-units 411A, 411B, and 411C, a second set of I/Q differential inter-unit lines, and I/Q differential intra-unit lines in baseband sub-units 401A, 401B, and 401C (see dotted line 417 showing total connected path).

Loopback testing is possible within system 400 because all elements within a loopback processing chain may function contemporaneously and may be coupled together in a manner that permits loopback testing. That is, in our example, the set of I/Q differential inter-unit lines coupling first DAC 402A to first TX 412A are separate from the set of I/Q differential inter-unit lines coupling first RX 413A to first ADC 403A. Therefore, the output of first DAC 402A and first RX 413A may both be enabled, thereby allowing the test data to be processed by the loopback processing chain. System 400 is configured such that the other baseband and RF sub-units shown in FIG. 4 may advantageously be tested in a similar manner.

Thus, wireless communication system 400 of FIG. 4 advantageously minimizes the number of inter-unit lines required to couple baseband unit 401 to RF unit 411. Relatively fewer inter-unit lines may reduce the cost of the IC package including system 400 because there are relatively fewer pins required to connect to the inter-unit lines. Design costs may also be reduced because fewer inter-unit lines, such as high bandwidth I/Q differential lines, may have to be designed to couple the baseband sub-units to the RF sub-units. The described line configuration of system 400 also advantageously enables loopback testing. Thus, portions of system 400 may be tested or calibrated without the need to transmit or receive data to or from a second wireless system.

In the exemplary wireless communication system of FIG. 4, the baseband sub-units include one DAC and one ADC. In other embodiments, a baseband sub-unit may include two or more DACs and two or more ADCs. Similarly, in other embodiments an RF sub-unit may include two or more transmitters and two or more receivers (i.e. two or more transceivers).

Exemplary wireless communication system 400 of FIG. 4 illustrates one embodiment of a wireless communication system that may be configured to reduce the number of inter-unit lines while enabling loopback testing. In other embodiments, the elements in the RF unit and the baseband unit may be coupled together in a different manner. For example, first DAC 402A may be coupled to third ADC 403C and first TX 412A may be coupled to third RX 413C. In this case, a loopback processing chain may still be configured with DAC 402A, TX 412A, RX 413A and ADC 403A.

Figure 5:
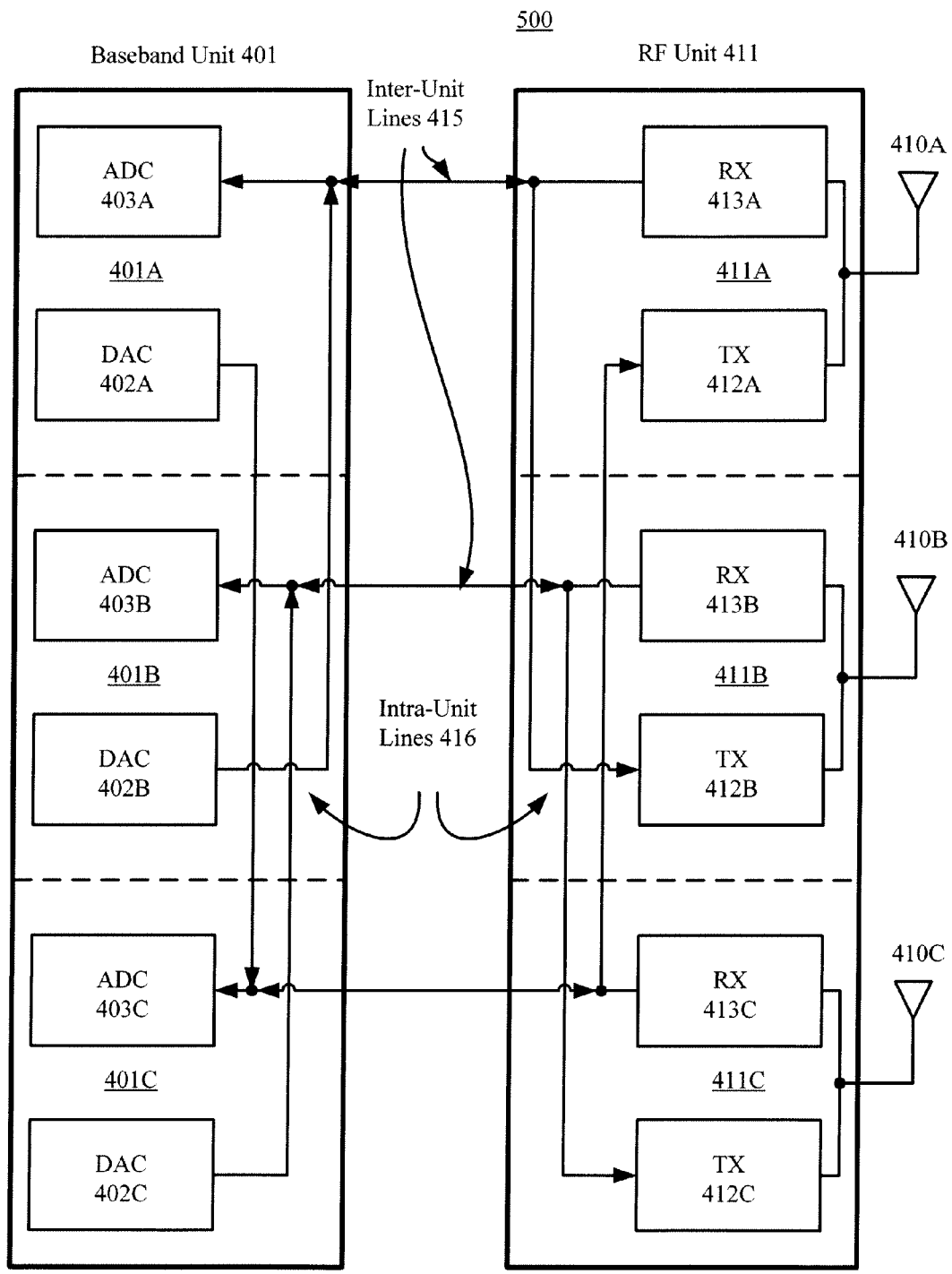
FIG. 5 is a block diagram illustrating another exemplary embodiment of a portion of a multiple transceiver wireless communication system configured according to the specification.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. For example, although FIG. 4 illustrates DACs 402 being coupled to TXs 412 using fewer I/Q differential intra-unit lines compared to those used to couple RXs 413 and ADCs 403, FIG. 5 illustrates a wireless communication system 500 that reverses this configuration, i.e. DACs 402 being coupled to TXs 412 using more I/Q differential intra-unit lines compared to those used to couple RXs 413 and ADCs 403. Moreover, note that in other embodiments, the components of the baseband unit may be connected to the components of the RF unit with non-differential lines, such as single-ended lines or the like. In still other embodiments, the number of baseband sub-units may differ from the number of RF sub-units. Accordingly, it is intended that the scope of the invention be defined by the following Claims and their equivalents.

The invention claimed is:

1. A wireless communication system comprising:
   a baseband unit including a plurality of baseband sub-units;
   an RF unit including a plurality of RF sub-units, each RF sub-unit including an antenna;
   a plurality of sets of inter-unit lines, each set of inter-unit lines connecting a baseband sub-unit and a corresponding RF sub-unit,
   wherein each baseband sub-unit and its corresponding RF sub-unit form a processing section for providing baseband reception and transmission as well as RF reception and transmission, and
   wherein communication from a first baseband sub-unit to a first RF unit of a first processing section and from a second RF sub-unit to a second baseband sub-unit of a second processing section share a set of inter-unit lines.

2. The wireless communication system of claim 1, further including a plurality of intra-unit lines for connecting components of different baseband sub-units.

3. The wireless communication system of claim 1, further including a plurality of intra-unit lines for connecting components of different RF sub-units.

4. The wireless communication system of claim 1, wherein certain components of each baseband sub-unit and RF sub-unit have enabled/disabled output terminals to coordinate sharing of the inter-unit lines.

5. The wireless communication system of claim 1, wherein each set of inter-unit lines includes I/Q differential lines.

6. The wireless communication system of claim 1, wherein the baseband unit is implemented on a first integrated circuit (IC) and the RF unit is implemented on a second IC, and wherein the plurality of sets of inter-unit lines are connected to pins of the first and second ICs.

7. A method of communicating in a wireless system, the wireless system including a baseband unit and an RF unit, the baseband unit including a plurality of baseband sub-units, the RF unit including a plurality of RF sub-units, each RF sub-unit including an antenna, each baseband sub-unit and its corresponding RF sub-unit forming a processing section for providing baseband reception and transmission as well as RF reception and transmission, the method comprising:
   communicating from a first baseband sub-unit to a first RF unit of a first processing section and from a second RF sub-unit to a second baseband sub-unit of a second processing section by sharing a common set of inter-unit lines.

8. A method of communicating in a wireless system, the wireless system including a baseband unit and an RF unit, the baseband unit including a plurality of baseband sub-units, the RF unit including a plurality of RF sub-units, each RF sub-unit including an antenna, each baseband sub-unit and its corresponding RF sub-unit forming a processing section for providing baseband reception and transmission as well as RF reception and transmission, the method comprising:
   communicating from a first baseband sub-unit to a first RF unit of a first processing section and from the first RF sub-unit to the first baseband sub-unit using inter-unit lines of different processing sections.

9. A method of providing loopback testing in a wireless system, the wireless system including a baseband unit and an RF unit, the baseband unit including a plurality of baseband sub-units, the RF unit including a plurality of RF sub-units, each RF sub-unit including an antenna, each baseband sub-unit and its corresponding RF sub-unit forming a processing section for providing baseband reception and transmission as well as RF reception and transmission, the method comprising:
   connecting a component of a first baseband sub-unit to a component of a first RF sub-unit using a first set of inter-unit lines; and
   connecting another component of the first RF sub-unit to another component of the first baseband sub-unit using a second set of inter-unit lines, the first and second sets of inter-unit lines corresponding to different processing sections.

10. The method of claim 9, wherein the steps of connecting further include using intra-unit lines and antenna lines to provide a loopback configuration.

* * * * *